(12) United States Patent
Bucur et al.

(10) Patent No.: US 10,763,512 B2
(45) Date of Patent: Sep. 1, 2020

(54) LITHIUM DEPOSITION WITH MULTILAYER NANOMEBRANE

(71) Applicant: Toyota Motor Engineering & Manufacturing North America, Inc., Erlanger, KY (US)

(72) Inventors: Claudiu B. Bucur, Ypsilanti, MI (US); John Muldoon, Saline, MI (US); Adrian Lita, Columbus, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1089 days.

(21) Appl. No.: 14/839,416

(22) Filed: Aug. 28, 2015

(65) Prior Publication Data
US 2017/0062832 A1   Mar. 2, 2017

(51) Int. Cl.
*H01M 4/66* (2006.01)
*H01M 4/134* (2010.01)
*H01M 4/1395* (2010.01)
*H01M 10/052* (2010.01)
*H01M 4/38* (2006.01)
*H01M 4/02* (2006.01)
*H01M 4/04* (2006.01)
*H01M 4/62* (2006.01)

(52) U.S. Cl.
CPC ......... *H01M 4/667* (2013.01); *H01M 4/0404* (2013.01); *H01M 4/045* (2013.01); *H01M 4/134* (2013.01); *H01M 4/1395* (2013.01); *H01M 4/382* (2013.01); *H01M 4/628* (2013.01); *H01M 4/661* (2013.01); *H01M 4/668* (2013.01); *H01M 10/052* (2013.01); *H01M 2004/021* (2013.01); *H01M 2300/0082* (2013.01); *H01M 2300/0094* (2013.01)

(58) Field of Classification Search
CPC .......... H01M 10/052; H01M 10/0525; H01M 10/0568; H01M 10/056; H01M 4/04; H01M 4/0402; H01M 4/0404; H01M 4/045; H01M 4/13; H01M 4/134; H01M 4/1395; H01M 4/661; H01M 4/662; H01M 4/667
See application file for complete search history.

(56) References Cited

U.S. PATENT DOCUMENTS

2014/0315081 A1* 10/2014 Zhang ................... H01G 11/48
                                                                                429/212
2017/0117583 A1*  4/2017 Matsuno ........... H01M 10/0525

OTHER PUBLICATIONS

Lutz Krasemann and Bernd Tieke, "Selective Ion Transport across Self-Assembled Alternating Multilayers of Cationic and Anionic Polyelectrolytes", Langmuir 2000, 16, 287-290 (Year: 1999).*

* cited by examiner

*Primary Examiner* — Mayla Gonzalez Ramos
(74) *Attorney, Agent, or Firm* — Oblon, McClelland, Maier & Neustadt, L.L.P.

(57) ABSTRACT

An electrode for a lithium battery constructed of a metal foil current collector, a coating of a pH sensitive polyelectrolyte polymer directly on the metal foil current collector; and a polyelectrolyte polymer nanomembrane comprising alternating layers of oppositely charged polyelectrolyte polymer wherein each succeeding polyelectrolyte layer has excess charge over the previous layer is provided. The pH sensitive polymer may be poly(allylamine hydrochloride) (PAH), poly(dimethyldiallyl ammonium chloride) (PDAD), poly (vinyl pyridine) (PPy), polyethyleneimine (PEI), polyacrylic acid (PAA), polymethacrylic acid (PMA) or poly(styrene sulfonic acid-maleic acid, sodium salt) (PSSM3:1).

10 Claims, 7 Drawing Sheets

LITHIUM DEPOSITION WITH MULTILAYER NANOMEBRANE

BACKGROUND

Development and commercialization of the lithium ion battery has changed the entire complexion of the energy technology of portable electronics and power tools. Lithium ion batteries now power electric vehicles and are starting to replace gas backup generators with the introduction of the Powerwall. However, consumer desire for cell phones that last longer and lower cost electric vehicles (EVs) having greater driving range continuously fuels an on-going demand for higher energy batteries. This quest attracts interest towards finding a post lithium ion battery with 2-3 times the energy density now available with conventional lithium ion technology. Post lithium ion battery research includes effort to develop lithium/sulfur, lithium/air and multivalent metal batteries which operate with metallic anodes.

Commercial lithium ion batteries offer high stability upon cycling but also require the use of a host material in the anode which does not contribute to capacity. In order to increase the capacity of the anode, innovative methods must be adopted without sacrificing cycling stability and safety. For example, an insertion graphite anode with a specific capacity of 380 mAh/g may be upgraded to a lithium metallic anode with a specific capacity of 3660 mAh/g. Challenges associated with the use of lithium metal anodes are rooted in the high electronegative potential of lithium and a resultant high reactivity with battery electrolytes.

The reduction of electrolytes on the surface of the lithium results in the formation of a solid electrolyte interface (SEI). This SEI is unstable and non-uniform due to rupturing and reformation during the reversible plating of lithium which occurs during charge and discharge cycles. The rigid SEI cannot withstand the mechanical stress caused by the uneven nucleation and formation of dendrites or mossy deposits of lithium that form during the charging deposition. Growth of dendrites causes a rapid and large increase in the surface area of the anode and can cause thermal runaway or shorting of the battery. Upon each regeneration of the SEI, additional electrolyte is decomposed by reduction and as a result the coulombic efficiency between the deposition and dissolution of lithium is limited to below 50% after a few cycles at high rates. The low coulombic efficiencies impact cycle life of the battery negatively. For example, a 50% coulombic efficiency renders half the deposited lithium unrecoverable on each cycle and quickly depletes the lithium in the battery. In addition to this electrochemically inactive lithium, rapid degradation of the electrolyte which occurs during SEI regeneration also limits cycle life.

Therefore, for practical batteries with metallic anodes, a coulombic efficiency above 99% is desirable (less than 1% of lithium "lost" on each cycle). There have been no reports of electrolytes which are reductively stable on lithium metal and therefore, success in this technology may be obtainable with formation of a uniform and flexible SEI on the lithium metal anode. Recent approaches to stabilize the lithium metal anode and avoid dendrite formation include development of new electrolytes or additives which promote more uniform lithium electrodeposition. A related approach has been the ex-situ formation of the SEI by pretreatment with chlorosilanes, chlorophosphines, and chloroboranes, which appear to form protective layers on the lithium anode surface through reaction with Li. (Dunn et al. J. Mater. Chem., 2011, 21, 1593-1599) Solid electrolytes, polymers, ceramics and interconnected carbon (Cui et al., Nat. Nanotechnol., 2014, 9, 618-623) have also been explored to mitigate dendrite nucleation by blocking their growth. These solid state approaches suffer from interface issues which remain largely unresolved.

Thus, there is an ongoing need for a thin film lithium-electrolyte interface that is flexible and self-healing and can accommodate a large volume expansion during lithium deposition without rupturing. Such a protective film would impede electrolyte decomposition and provide for an electrochemical cell having enhanced coulombic efficiency.

SUMMARY

This and other objects are achieved by the technical embodiments described in the following paragraphs, Claims and associated drawings. The first embodiment includes an electrode for a lithium battery, comprising: a metal foil current collector; a coating of a pH sensitive polyelectrolyte polymer, directly on the metal foil current collector; and a polyelectrolyte polymer nanomembrane comprising alternating layers of oppositely charged polyelectrolyte polymer wherein each succeeding polyelectrolyte layer has excess charge over the previous layer.

DESCRIPTION OF THE EMBODIMENTS

The inventors have previously reported application of polyelectrolyte membrane technology to form carbon sulfur composites particles which are useful as electrode active materials (U.S. Pat. No. 8,980,471). In that work it was demonstrated that a flexible, self-healing layer-by-layer (LBL) nanomembrane assembled based on polyelectrolyte polymer ion exchange allows the rapid diffusion of lithium ions into the cathodic material while accommodating volume expansion and impeding the dissolution of polysulfides into the electrolyte in a lithium-sulfur battery. In the present embodiments the inventors have surprisingly discovered that with modification as described below, analogs of the polyelectrolyte nanomembrane have the capability to impede dendritic growth of lithium and may enhance coulombic efficiencies obtained with the cells of the embodiments disclosed herein.

Layer-by-layer (LBL) self-assembly techniques are conventionally known and permit the fabrication of multilayered thin films on solid supports by the self-limiting adsorption of cationic and anionic species with more than the stoichiometric number of charges (relative to the substrate), from dilute aqueous solutions. According to this method, each adsorbed layer reverses the surface charge of the growing membrane coated substrate. The driving force for the multilayer film buildup is primarily ion exchange between polyelectrolyte counterions and oppositely charged sites on the "partner" polymer backbone. Precise measurements have concluded that these compensation exchanges responsible for assembly are entropic in nature (see Manthiram et al., Chem Rev., 2014,114, 11751-11787). While the "electrostatic" model is the more popular LBL method of thin film formation, other methods including layer-on-layer association of polymers bearing hydrogen bond donors and acceptors based on hydrogen bonding as a driving force are also known.

In initial application of LBL technology to the formation of a lithium metal electrode, a multilayer nanomembrane was assembled by the sequential adsorption of a positive polyelectrolyte such as PDAD and a negative polyelectrolyte such as PEDOT:PSS on a copper disk substrate. The reversible lithium deposition from a lithium metal counter electrode was characterized electrochemically in an EL-CELL. A coulombic efficiency of ~70% over the first 15 cycles was observed for the copper current collector coated with the nanomembrane. Such results offered no significant improvement over the deposition of lithium on an unprotected copper current collector. It was apparent that the application of the polyelectrolyte nanomembrane coating does not stabilize the SEI which forms during the reversible lithium deposition. While not intending to be constrained by theory, the inventors hypothesized that if the nanomembrane strongly adheres to the copper substrate, lithium nucleation can only occur in concert with the fragmentation of the nanomembrane.

In consideration of this problem, the inventors determined that a solution may be obtained by creation of a structure wherein space for lithium nucleation is available beneath a nanomembrane which is permeable to lithium ions. Accordingly, a pH sensitive interface between a metal substrate such as, for example a copper foil and the multilayer nanomembrane which would permit the creation of free space for lithium nucleation via pH control after fabrication was envisioned.

For example, the positively charged polymer poly(allylamine hydrochloride) (PAH) contains —NH3(+) functionalities. PAH may be deprotonated to its neutral form (PA) in basic media. Thus, if used as a first layer, PAH would form a first cationic layer on the metal substrate surface and thus allow for the assembly of the polyelectrolyte nanomultilayer. Post assembly modification may be obtained by exposure to pH's higher than 4.5 which will partially (or completely) deprotonate PAH to form PA which causes a partial decoupling of the nanomembrane from the substrate. This partial decoupling may in part be due to the interpenetration of the polyelectrolyte layers. As many as four to five layers may be required to obtain full coverage of a substrate after which there is a linear growth of the multilayer. As a result, since direct anchorage between the third positively charged polymer layer (poly(dimethyldiallylammonium chloride) (PDAD), for example) and the substrate is expected, deprotonation of the first PAH layer would not fully decouple the nanomembrane from the metal substrate.

This post assembly modification of the interface was corroborated by preparation of multilayer structure comprising a first layer of PAH and 14 layers of alternating poly (dimethyldiallylammonium chloride) (PDAD) and poly(3, 4-ethylenedioxythiophene:polystyrene sulfonate (PEDOT: PSS) (PDAD/PEDOT:PSS) on a polished silicon wafer substrate. The structure becomes 50% thicker upon exposure to a pH 10 solution of sodium hydroxide and the inventors believe this increase is due to the space created at the interface between the substrate and the nanomembrane as PAH converts to PA. It is noteworthy that a multilayer composed of 14 layers of PDAD/PEDOT:PSS undergoes only a 5% change in thickness following exposure to a pH 10 solution.

Figure 1:
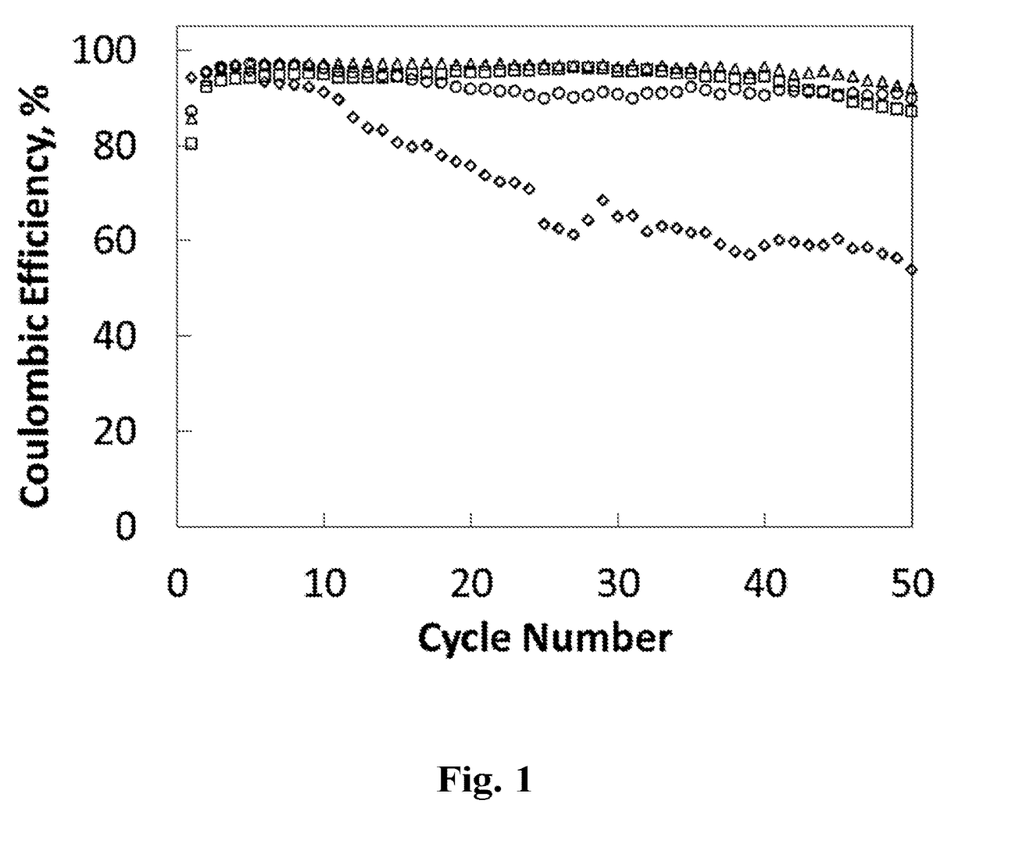
FIG. 1 shows a comparison of cycling performances of untreated copper electrode (diamond, ◇) to copper electrodes coated by nanomembranes composed of PAH+(PEDOT:PSS/PDAD) 14 (square, □), PAH+(PEDOT:PSS/PPy) 14 (circles, ○) and PAH+(Nafion/PDAD) 14 (triangles, Δ).
Figure 2:
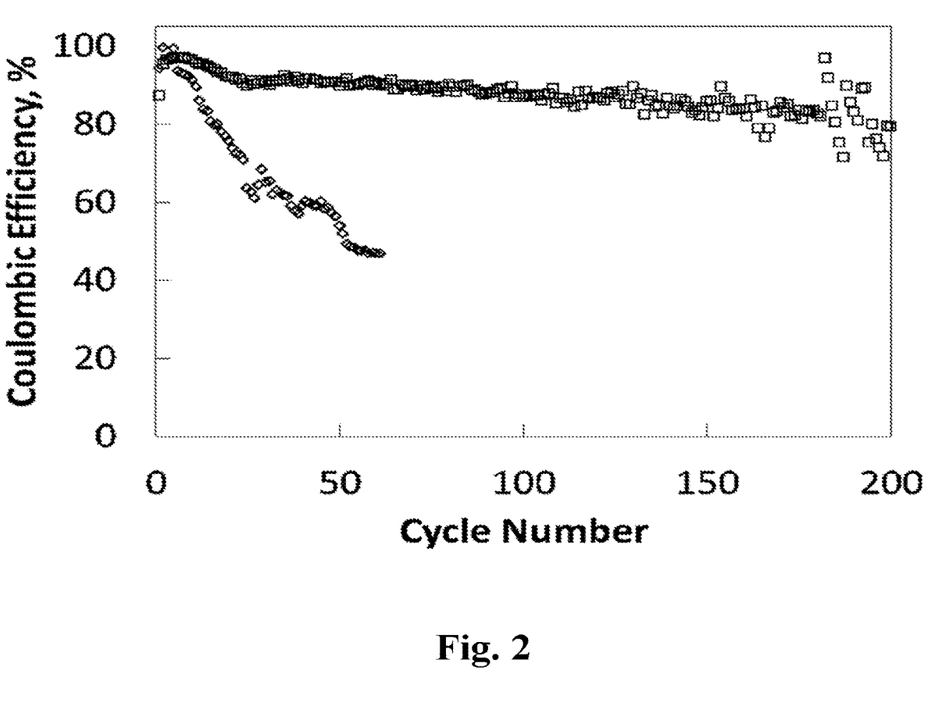
FIG. 2 shows long term performance of PAH+(PEDOT:PSS/PDAD) 14 (square, □) in comparison to an untreated copper electrode (diamond, ◇)
Figure 3:
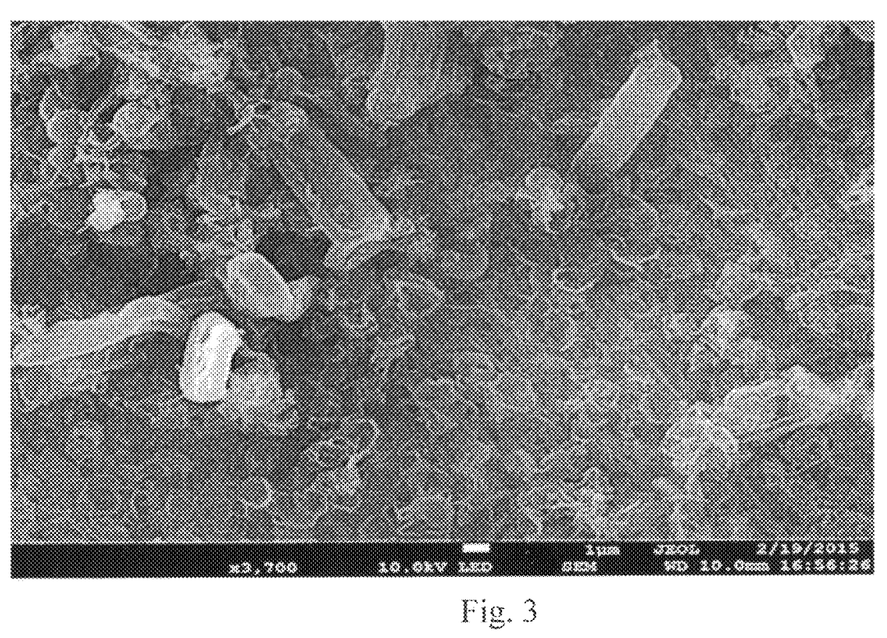
FIG. 3 shows a SEM image of lithium deposits on untreated copper electrode.
Figure 4:
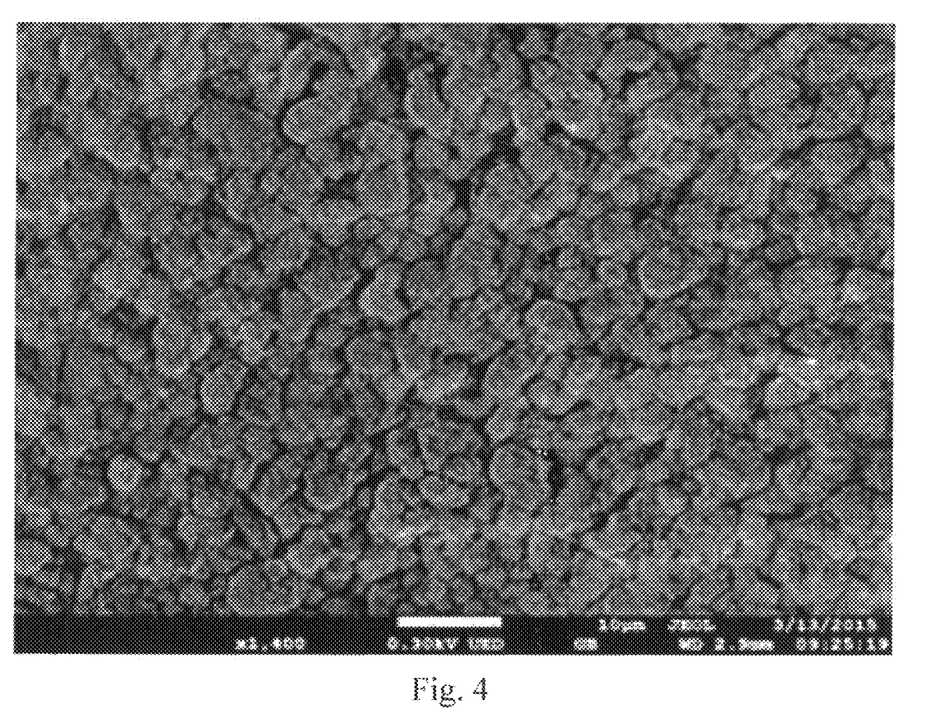
FIG. 4 shows a SEM image of lithium deposits on a nanomembrane coated copper electrode according to an embodiment.

Consistent with the inventors' hypothesis, a distinct enhancement in coulombic efficiency was provided by the modification of the interface between the nanomembrane and a copper current collector. On average, 95% of the lithium deposited is recovered for 50 cycles when each of a 14 layer nanomembrane of PDAD/PEDOT:PSS, a 14 layer nanomembrane of PPy(poly(vinylpyridine)/PEDOT:PSS and a 14 layer nanomembrane of PDAD/Nafion are interfaced with a copper substrate by the pH sensitive PAH layer (FIG. 1). Moreover, 85% of the deposited lithium could be recovered after 200 cycles (FIG. 2). Significantly and unexpectedly, the deposits on the nanomembrane coated copper are granular and dense with needle-like or dendritic structures being absent (FIG. 4). In contrast, the coulombic efficiency for the reversible deposition of lithium on a copper electrode without a nanomembrane drops below 60% by cycle 20. The morphology of the lithium deposited on the copper electrode is dendritic with visible needle-like structures (FIG. 3).

In a first embodiment an electrode for a lithium battery is provided. The electrode comprises: a metal foil current collector; a coating of a pH sensitive polyelectrolyte polymer, directly on the metal foil current collector; and a polyelectrolyte polymer nanomembrane comprising alternating layers of oppositely charged polyelectrolyte polymer wherein each succeeding polyelectrolyte layer has excess charge over the previous layer.

The metal foil may be any metal conventionally employed as an anode current collector and includes stainless steel, aluminum and copper. In preferred embodiments, the metal foil is copper.

Any polyelectrolyte polymer which can be altered in chemical form with a pH change in chemical environment may be applied in a first layer to the metal substrate. Nonlimiting examples of pH sensitive polymers include poly(allylamine hydrochloride) (PAH), poly(dimethyldiallyl ammonium chloride) (PDAD), poly(vinyl pyridine) (PPy), polyethyleneimine (PEI), polyacrylic acid (PAA), polymethacrylic acid (PMA) and poly(styrene sulfonic acid-maleic acid, sodium salt) (PSSM3:1). Preferred pH sensitive polymers are poly(allylamine hydrochloride) (PAH), poly(dimethyldiallyl ammonium chloride) (PDAD) and poly(vinyl pyridine) (PPy). Most preferred may be poly(allylamine hydrochloride) (PAH).

Once a pH sensitive foundation layer is first applied to the metal substrate further alternating charged layers may be applied as conventionally known in LBL technology to form the polyelectrolyte nanomembrane. LBL technology and application methods are conventionally known to one of skill in the art and reference is made to Decher (Science, Vol. 277, Aug. 29, 1997), Schlenoff et al. (Macromolecules 1999, 32, 8153-8160) and Hammond-Cunningham et al. (U.S. Pat. No. 8,075,951) as exemplary descriptions of LBL methods.

As indicated in the Examples the coated substrate may be repeatedly exposed to dilute solutions of the respective polyelectrolyte polymers, for example by dipping, spin coating or application by doctor blade as known to one of skill in the art. In a preferred method the multilayer membrane may be prepared with an automated system such as a nanoStrata robot as supplied by nanoStrata Inc. PO Box 4031, Tallahassee, Fla, 32315. After application of each respective layer, the freshly coated substrate may be washed free of non-adhered polyelectrolyte polymer, dried, preferably under nitrogen atmosphere and then the next polyelectrolyte layer applied with repeat of the application wash and drying operations.

With a positively charged pH sensitive layer such as PAH, the first applied polyelectrolyte is one carrying a negative charge or one capable of being negatively charged. Although any such negative polyelectrolyte may be suitable, in a preferred embodiment, the negatively charged polyelectrolyte polymer may be selected from the group consisting of a salt of poly(styrene sulfonate) (PSS), a salt of a polyacrylic acid (PAA), a salt of a polymethacrylic acid (PMA), a poly(2-acrylamido-2-methyl-1-propanesulfonic acid), a salt of a poly(vinylbenzenephosphonic acid), sulfonated tetrafluoroethylene (Nafion) and poly(3,4-ethylenedioxythiophene:polystyrene sulfonate (PEDOT:PSS). The salt form of the polyelectrolyte may be any of the soluble salts and preferably may be any of lithium, sodium, potassium, ammonium or alkyl ammonium salts.

The next sequential layer may be a polymer of positive charge having ammonium groups. In a highly preferred embodiment the polymer having ammonium groups may be selected from the group consisting of a poly(allylammonium salt), poly(vinylpyridinium salt) (PPy) and a poly(diallyldimethylammonium salt) (PDAD). Although any soluble salt may be employed, halide salt is preferred and most preferably, a chloride salt may be used.

Generally the polyelectrolyte dilute solution will contain a lithium salt such as lithium chloride or lithium nitrate to assist the deposition process. As used here a dilute solution is considered to be 10 mM or less in polymer concentration.

The wash/rinse solutions may also contain a lithium salt electrolyte, generally the same salt as included in the polymer solution.

Figure 5:
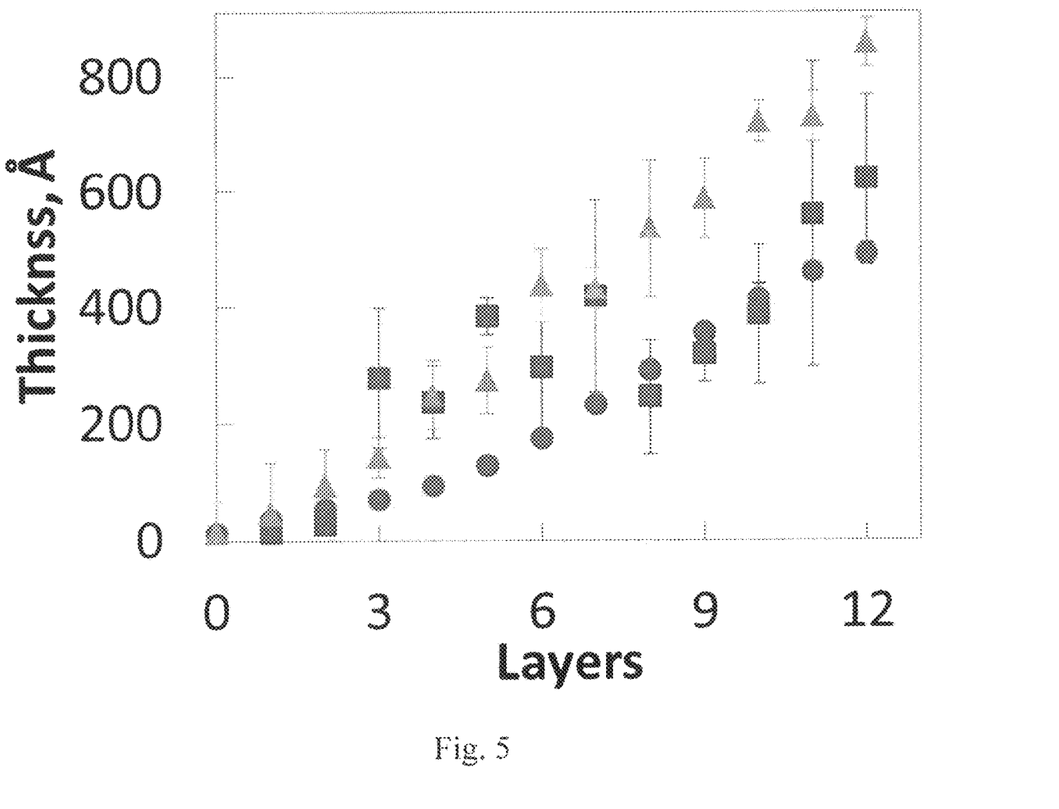
FIG. 5 shows a graph of membrane thickness relative to layer by layer adsorption of multilayer nanomembranes composed of PPy/PEDOT:PSS (circles), PDAD/PEDOT:PSS (squares) and PDAD/Nafion (triangles).

There is no limit to the number of polyelectrolyte layers that may be formed in the preparation of the nanomembrane and generally the properties being sought will determine the number of layers. In some embodiments the number of layers may be from 6 to 20 total alternating charged layers, preferably 8-18 total alternating layers and most preferably 10 to 16 total alternating layers. As indicated in FIG. 5, once 3-4 layers are applied to the pH sensitive initial layer the width of the nanomembrane increases directly with increasing number of layers. Depending on the chemical structure of the polyelectrolyte polymers the thickness of the nanomembrane may be from approximately 100 Å to 1000 Å.

In preferred embodiments the alternating polyelectrolyte multilayer nanomembrane may be selected from the group consisting of PEDOT:PSS/PPy, PEDOT:PSS/PDAD and Nafion/PDAD.

Once the basic metal substrate, pH sensitive interface, polyelectrolyte nanomembrane structure is formed, a SEI layer is formed on the nanomembrane surface which is not facing the metal substrate and is a distant surface from the metal substrate by a method which precludes deposition of lithium metal on the metal substrate. For example the system may be exposed to multiple voltammogram cycles to build the SEI. Once the SEI is formed, lithium metal may be deposited from a lithium metal source onto the metal substrate by a galvanostatic method.

Thus in one embodiment another form of an electrode for a lithium battery is provided. The electrode comprises: a metal foil current collector; a coating of a pH sensitive polyelectrolyte polymer, directly on the metal foil current collector; a polyelectrolyte polymer nanomembrane comprising alternating layers of oppositely charged polyelectrolyte polymer wherein each succeeding polyelectrolyte layer has excess charge over the previous layer, and a solid electrolyte interface formed on the polyelectrolyte polymer nanomembrane.

In a further embodiment a method to prepare an anode for a secondary lithium battery is provided. The method comprises:

coating a metal foil current collector with a pH sensitive polyelectrolyte polymer;

applying layers of alternating oppositely charged polyelectrolyte polymers to the pH sensitive layer using a layer-by-layer (LBL) method;

forming a solid electrolyte interface on a surface of the polyelectrolyte nanomembrane distant from the metal current collector; and electrodepositing lithium metal on the metal foil current collector beneath the pH sensitive polyelectrolyte layer;

wherein the lithium is electrodeposited at a pH such that electrostatic bonds between the metal of the foil current collector and the pH sensitive polyelectrolyte polymer are at least partially decoupled.

In preferred aspects of the method embodiment, the metal of the foil current collector is one of stainless steel, copper and aluminum. The pH sensitive layer may comprise the polymers previously listed and most preferably comprises one of poly(allylamine hydrochloride) (PAH), poly(dimethyldiallyl ammonium chloride) (PDAD) and poly(vinyl pyridine) (PPy). The polyelectrolyte nanomembrane may comprise any of the polyelectrolyte polymers previously listed and most preferably comprises one of PEDOT:PSS/PPy, PEDOT:PSS/PDAD and Nafion/PDAD.

The polyelectrolyte nanomembrane may be grown according to LBL methods to a thickness from approximately 100 Å to approximately 1000 Å and the formation of the SEI must be accomplished under electrochemical conditions wherein lithium metal is not deposited on the metal current collector.

In another embodiment, a lithium secondary battery, comprising the electrode for a lithium battery described in the various embodiments of the above text is provided. The battery may be constructed according to conventionally known structure and may contain a nonaqueous electrolyte solvent and a lithium salt or a solid polymer electrolyte, and a cathode. The cathode may be the cathode described in U.S. Pat. No. 8,980,471, the description of which is incorporated herein by reference in its entirety.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

EXAMPLES

Polyelectrolyte Nanomembrane without pH Sensitive First Layer

A multilayer nanomembrane was assembled by the sequential adsorption of the positive polyelectrolyte poly (dimethyldiallylanunonium chloride) (PDAD) and the negative polyelectrolyte poly(3,4-ethylenedioxythiophene:polystyrene sulfonate (PEDOT:PSS) on a copper disk substrate. The reversible lithium deposition from a lithium metal counter electrode was characterized electrochemically in an EL-CELL. A coulombic efficiency of ~70% over the first 15 cycles was observed for the copper current collector coated with the nanomembrane.

Such efficiency was not a significant improvement over the efficiency obtained when lithium was deposited on an unprotected copper current collector. Therefore, the addition of the nanomembrane did not stabilize the SEI which formed during the reversible lithium deposition.

Polyelectrolyte Nanomembrane with a pH Sensitive First Layer

Multilayer polyelectrolyte nanomembranes were built on an inverted copper substrate with a surface area of 2 cm$^2$ using a Nanostrata robot. The substrate was spun and immersed in a dilute polymer solution of a positively charged polyelectrolyte such as poly(allylamine hydrochloride) (PAH), poly(dimethyldiallyl ammonium chloride) (PDAD) or poly(vinyl pyridine) (PPy) for 5 minutes. Three 30 second rinses followed after which the substrate was dried with nitrogen for 30 seconds. Next the substrate was immersed for 5 minutes into a dilute solution of a negatively charged polyelectrolyte such as PEDOT:PSS or Nafion (sulfonated tetrafluoroethylene). Three 30 second rinses were followed by 30 second nitrogen drying time segments. All polymer solutions contained 0.1M LiNO$_3$ and were below 10 mM in polymer concentration. Rinse solutions also contained 0.1M LiNO$_3$. The PEDOT:PSS polymer solution was prepared by diluting 0.1 ml of 1% stock PEDOT:PSS solution to 100 ml. The PPy solution preparation consisted of two steps. First, 0.1 ml of the 5% stock solution from Sigma was diluted to 100 ml and maintained at a pH of 1.7. Second, 6 ml of this solution was diluted to 100 ml and maintained at a pH of 1.7. In the case of the PPy containing nanomembrane, the oppositely charged polymer solution and all the rinses were also maintained at pH=1.7.

All polymers and salts were purchased from Sigma Aldrich.

After assembly, the nanomembrane coated substrate was inserted in a pH=10 solution (prepared with sodium hydroxide) for 5 hours, rinsed well then dried under vacuum in an oven at a temperature of 70° C. for 2 hours. The thickness of the PAH containing nanomembranes changed from ~60 nm after fabrication to ~90 nm after exposure to pH 10. A layer by layer buildup performed by hand, where the thickness of the nanomembrane on a polished silicon wafer substrate was measured after each layer with a Gaertner ellipsometer is plotted in FIG. 5.

A multilayer comprising a first layer of PAH and 14 layers of PDAD/PEDOT:PSS on a polished silicon wafer substrate became 50% thicker upon exposure to a pH 10 solution of sodium hydroxide. In comparison, a multilayer composed of 14 layers of PDAD/PEDOT:PSS with no underlying pH sensitive layer underwent only a 5% change in thickness following exposure to a pH 10 solution.

A distinct enhancement in coulombic efficiency was obtained by the inclusion of the pH sensitive layer at the interface between the nanomembrane and the copper current collector. On average, 95% of the lithium deposited was recovered for 50 cycles when a 14 layer nanomembrane of PDAD/PEDOT:PSS, PPy/PEDOT:PSS or PDAD/Nafion was interfaced with the copper substrate by the pH sensitive PAH layer. FIG. 1 shows a comparison of the cycling performances of an untreated copper electrode (diamond, ◊) to copper electrodes coated by nanomembranes composed of PAH+(PEDOT:PSS/PDAD) 14 (square, □), PAH+(PEDOT:PSS/PPy) 14 (circles, ○) and PAH+(Nafion/PDAD) 14 (triangles, Δ) after 50 cycles. FIG. 2 shows a comparison of the cycling performances of an untreated copper electrode (diamond, ◊) to copper electrodes coated by nanomembranes composed of PAH+(PEDOT:PSS/PDAD) 14 (square, □). As shown 85% of the deposited lithium could be recovered after 200 cycles for the PAH+(PEDOT:PSS/PDAD) 14 coated electrode. In contrast, the coulombic efficiency for the reversible deposition of lithium on a copper electrode without a nanomembrane was below 60% by cycle 20. 0.5 mAh/cm$^2$ of lithium was deposited in all instances. The rate of deposition/dissolution was 0.5 mA/cm$^2$. Dissolution was carried out to 2.0V vs. the copper electrode. The morphology of the lithium deposited on the copper electrode is dendritic with visible needle-like structures (FIG. 3). In contrast, the deposits on the nanomembrane coated copper are granular, dense and needle-like structures were absent (FIG. 4).

Electrochemical Testing

The dry, nanomembrane coated copper electrode was inserted into an EL-Cell as the working/reference electrode. One Celgard separator was placed on top of the copper electrode, followed by 150 μl electrolyte. The electrolyte consisted of a 1M LiTFSI solution in a 50:50 1,3-dioxolane (DOL)/1,2-dimethoxyethane (DME) solvent also containing 0.2M LiNO$_3$ and 50 mM CsNO$_3$. A pretreated lithium metal foil was placed on top of the wet separator. Pretreatment consisted of exposure of the lithium metal to a concentrated solution of lithium polysulfides for 2 hours. After pretreatment, the lithium metal foil was rinsed with THF, dried and inserted in the test cell containing the nanomembrane coated copper electrode. Galvanostatic lithium deposition/dissolution was precluded by 10 cyclic voltammograms between 0.1V and 2.0V vs. Li designed to form a stable SEI on the nanomembrane. 0.5 mAh lithium per cm$^2$ was then deposited. Dissolution was carried out to 2V vs. lithium. All electrochemical measurements were performed using a Bio-Logic VMP3 tester.

Figure 6:
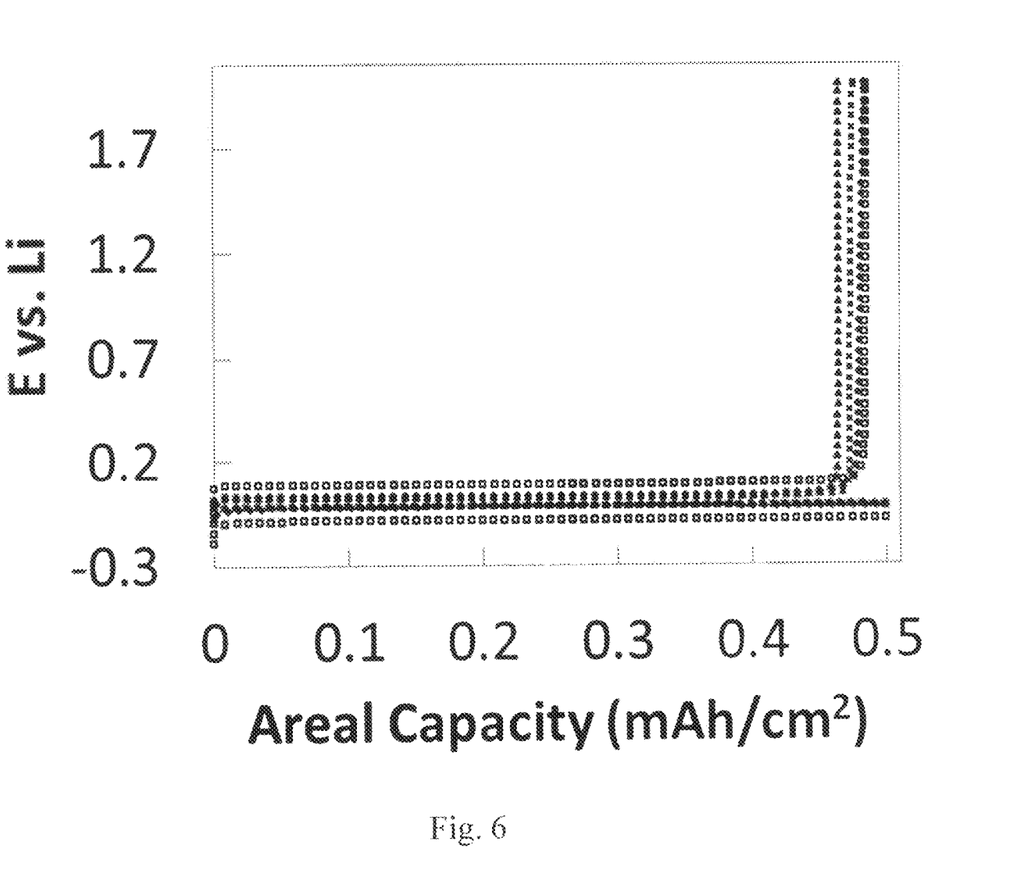
FIG. 6 shows voltage profiles for the $7^{th}$ cycle of the lithium deposition/dissolution process with lithium metal as the reference electrode at 0.5 mA/cm².
Figure 7:
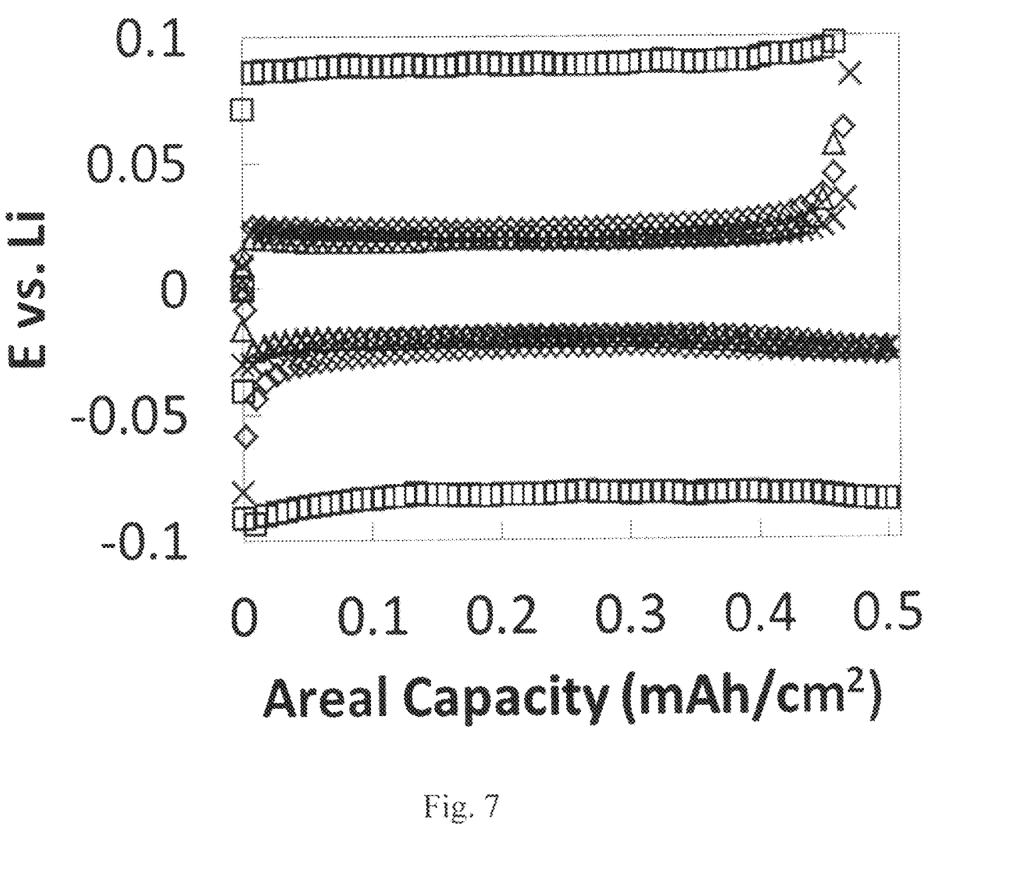
FIG. 7 shows expanded profiles of FIG. 6 with the exception of PAH+(PPy/PEDOT:PSS)$_{14}$.

FIG. 6 shows voltage profiles for the 7$^{th}$ cycle of the lithium deposition/dissolution process with lithium metal as the reference electrode at 0.5 mA/cm$^2$. Comparison of reversible deposition on a bare copper electrode (blue ◊) to the following nanomembrane coatings: PAH+(PPy/PEDOT:PSS)$_{14}$ (purple □), PAH+(PDAD/PEDOT:PSS)$_{14}$ (garnet X) and PAH+(PDAD/Nafion)$_{14}$ (green Δ) was made. FIG. 7 shows an expanded similar overpotential for the bare and nanomembrane coated copper electrodes with the exception of PAH+(PPy/PEDOT:PSS)$_{14}$. These profiles may suggest a smaller diffusion coefficient for the lithium ions through this multilayer nanomembrane which requires a higher overpotential to initiate and maintain the reduction of lithium.

The invention claimed is:
1. An electrode for a lithium battery, comprising, in the order listed:
   a metal foil current collector;

a granular layer of electrodeposited lithium metal on the surface of the metal foil current collector;

a coating of a pH sensitive polyelectrolyte polymer on the electrodeposited lithium metal layer;

a polyelectrolyte polymer nanomembrane on the pH sensitive polyelectrolyte polymer which comprises alternating layers of oppositely charged polyelectrolyte polymer wherein each succeeding polyelectrolyte layer has excess charge over the previous layer, and a solid electrolyte interface on a surface of the polyelectrolyte nanomembrane which is not facing the metal foil current collector;

wherein the granular lithium metal layer is electrodeposited on the metal foil collector after the coating of a pH sensitive polyelectrolyte polymer, the polyelectrolyte polymer nanomembrane and the solid electrolyte interface are formed.

2. The electrode of claim 1, wherein the metal foil coating comprises a metal selected from the group consisting of stainless steel, copper and aluminum.

3. The electrode of claim 1, wherein the pH sensitive polymer is one selected from the group consisting of poly(allylamine hydrochloride) (PAH), poly(dimethyldiallyl ammonium chloride) (PDAD), poly(vinyl pyridine) (PPy), polyethyleneimine (PEI), polyacrylic acid (PAA), polymethacrylic acid (PMA) and poly(styrene sulfonic acid-maleic acid, sodium salt) (PSSM3:1).

4. The electrode of claim 1, wherein a negatively charged polyelectrolyte polymer of the polyelectrolyte polymer nanomembrane is a polymer selected from the group consisting of a salt of poly(styrene sulfonate) (PSS), a salt of a polyacrylic acid (PAA), a salt of a polymethacrylic acid (PMA), a poly(2-acrylamido-2-methyl-1-propanesulfonic acid), a salt of a poly(vinylbenzenephosphonic acid), sulfonated tetrafluoroethylene (Nafion) and poly(3,4-ethylenedioxythiophene:polystyrene sulfonate (PEDOT:PSS).

5. The electrode of claim 1, wherein a positively charged polyelectrolyte polymer of the polyelectrolyte polymer nanomembrane is a polymer selected from the group consisting of a poly(allylammonium salt), a poly(vinylpyridinium salt) (PPy) and a poly(diallyldimethylammonium salt) (PDAD).

6. The electrode of claim 1, wherein no dendrites are present on the electrodeposited lithium metal as observed in a scanning electron microscope image of the lithium layer.

7. The electrode of claim 6, wherein the polyelectrolyte nanomembrane is from 100 Å to 1000 Å thick.

8. An electrode for a lithium battery, comprising:
a copper metal current collector;
a layer of a pH sensitive polyelectrolyte polymer directly coated on a surface of the copper current collector; and
a polyelectrolyte polymer nanomembrane comprising alternating layers of oppositely charged polyelectrolyte polymer wherein each succeeding polyelectrolyte layer has excess charge over the previous layer;
wherein
the pH sensitive polymer is a polymer selected from the group consisting of poly(allylamine hydrochloride) (PAH), poly(dimethyldiallyl ammonium chloride) (PDAD) and poly(vinyl pyridine) (PPy), and
the polyelectrolyte polymer nanomembrane comprises alternating layers of oppositely charged polyelectrolyte polymer selected from the group consisting of PEDOT:PSS/PPy, PEDOT:PSS/PDAD and Nafion/PDAD.

9. The electrode for a lithium battery of claim 8 wherein the polyelectrolyte nanomembrane is from 100 Å to 1000 Å thick.

10. A lithium secondary battery, comprising:
an electrode of claim 1 as an anode;
an electrolyte comprising a non-aqueous solvent and a lithium salt; and
a cathode.

* * * * *